US007574705B2

(12) United States Patent
Taivalsaari et al.

(10) Patent No.: US 7,574,705 B2
(45) Date of Patent: Aug. 11, 2009

(54) METHOD AND APPARATUS FOR EFFICIENTLY RESOLVING SYMBOLIC REFERENCES IN A VIRTUAL MACHINE

(75) Inventors: Antero K. P. Taivalsaari, Siivikkala (FI); William F. Pittore, Lexington, MA (US); Bernd J. W. Mathiske, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 863 days.

(21) Appl. No.: 10/880,785

(22) Filed: Jun. 29, 2004

(65) Prior Publication Data

US 2005/0289543 A1  Dec. 29, 2005

(51) Int. Cl.
*G06F 9/44* (2006.01)
(52) U.S. Cl. .................. 717/162; 717/163; 717/164
(58) Field of Classification Search ............. 717/124, 717/162–166; 715/764; 707/1, 104.1; 705/36
See application file for complete search history.

(56) References Cited

U.S. PATENT DOCUMENTS

| | | | | |
|---|---|---|---|---|
| 5,594,903 | A | * | 1/1997 | Bunnell et al. ............. 717/162 |
| 5,878,263 | A | * | 3/1999 | Fortin et al. ............... 717/162 |
| 5,960,171 | A | * | 9/1999 | Rotman et al. .............. 714/49 |
| 6,363,436 | B1 | | 3/2002 | Hagy |
| 6,382,846 | B1 | | 5/2002 | Lai |
| 6,574,626 | B1 | * | 6/2003 | Regelman et al. ............ 707/6 |
| 6,973,646 | B1 | * | 12/2005 | Bordawekar et al. ....... 717/146 |
| 6,983,460 | B1 | * | 1/2006 | Goire et al. ............... 717/175 |
| 7,155,708 | B2 | * | 12/2006 | Hammes et al. ............ 717/155 |
| 2002/0069342 | A1 | * | 6/2002 | Ginsberg .................. 711/209 |
| 2004/0230949 | A1 | * | 11/2004 | Talwar et al. ............. 717/118 |
| 2005/0028155 | A1 | * | 2/2005 | Jung ........................ 718/1 |
| 2005/0132179 | A1 | * | 6/2005 | Glaum et al. .............. 713/1 |

FOREIGN PATENT DOCUMENTS

| | | |
|---|---|---|
| EP | 1164478 A2 | 10/1993 |
| EP | 0810522 A2 | 5/1997 |
| WO | WO00/17747 A1 | 3/2000 |

OTHER PUBLICATIONS

Levine "Linkers & Loaders" 1999, Morgan Kaufmann Publishers, pp. 56-57, 160-161, 210-211.*

* cited by examiner

*Primary Examiner*—Lewis A Bullock, Jr.
*Assistant Examiner*—Jason Mitchell
(74) *Attorney, Agent, or Firm*—Park, Vaughan & Fleming LLP

(57) ABSTRACT

One embodiment of the present invention provides a system that facilitates efficiently resolving symbolic references in a virtual machine to support in-place execution. During operation, the system loads an in-place executable file into the virtual machine, and receives a pointer that points to an unresolved symbol value in the in-place executable file. This unresolved symbol value includes an offset value that points to a subsequent unresolved symbol value in a chain of unresolved symbol values within the in-place executable file, and a token value that can be used to look up a corresponding resolved reference value in an unresolved symbol table. The system then uses the token value to look up the corresponding resolved reference in the unresolved symbol table, and replaces the unresolved symbol value with the corresponding resolved reference.

27 Claims, 2 Drawing Sheets

METHOD AND APPARATUS FOR EFFICIENTLY RESOLVING SYMBOLIC REFERENCES IN A VIRTUAL MACHINE

BACKGROUND

1. Field of the Invention

The present invention relates to computer systems with virtual machines. More specifically, the present invention relates to a method and an apparatus that facilitates efficient linking of symbolic references in a virtual machine that supports in-place execution.

2. Related Art

The Java 2 Platform, Micro Edition (J2ME™), has become very popular in the wireless device space. Motorola, Nokia, NTT DoCoMo, RIM, Siemens, and many other key players in the wireless device industry have recently started shipping J2ME-enabled devices in very high volume. It has been estimated that over 200 million J2ME-enabled mobile phones were shipped in 2003 alone.

However, in spite of the success of the J2ME platform, significant challenges for Java™ technology remain in the memory-constrained device space. One major limiting factor in J2ME application development is application size. With the deployment of more significant J2ME applications in mobile devices, J2ME application downloads will consume an increasingly large amount of wireless network bandwidth. Moreover, the runtime dynamic memory costs and application startup costs associated with anything but small J2ME applications are still excessive for most mass-market consumer devices, as well as for serious mobile systems software development in the Java programming language.

Various techniques can be used to optimize the memory consumption and application startup costs of a Java Virtual Machine (JVM). One of the most promising approaches for dramatically reducing the memory consumption and application startup time of a JVM is a technology called "in-place execution."

In a Java virtual machine that supports in-place execution, the standard Java class file format is replaced with a representation that can be used directly as runtime structures for the virtual machine, without the conventional and costly class loading process. Static data structures, such as classes, method tables, field tables, exception handlers, and symbols, are never actually loaded into the virtual machine. Instead, they are accessed directly from the static representation. In mobile devices, where the static representation can be kept in flash memory or ROM, this can result in dramatic RAM consumption savings, as well as battery conservation, typically on the order of five-fold to ten-fold. The static size of these applications is typically much smaller than with regular Java class files or JAR files. This can be accomplished without any loss of symbolic information or dynamic linkability of Java applications.

Unfortunately, in-place execution has disadvantages when it comes to execution speed. For example, since in-place executable code is immutable, various commonly used runtime optimizations that depend on the ability to modify bytecodes at runtime cannot be used. Moreover, since in-place executable files (henceforth referred to as "IPE files" or IPEFs) are intended to be portable and easily relocatable in memory, all the references in the files must be offsets or symbolic references rather than pointers. This introduces additional levels of indirection at runtime, which slows down execution speed.

Symbolic references (i.e., references that are "by name" rather than by pointer or offset) are especially problematic, since resolving a symbolic reference typically necessitates a costly symbolic lookup (e.g., a hashtable lookup using a string-based search key). Symbolic references are frequently needed in IPEFs, for instance, when referring to data structures or functions that are already assumed to be present on the target device when the IPEF is being installed on the target device.

Because of these problems, in-place execution has not yet been widely utilized in Java Virtual Machines, even though such technology would otherwise be ideal for mobile phones and other typical target devices of the Java 2 Platform, Micro Edition.

Hence, what is needed is a method and an apparatus that facilitates in-place execution without the problems listed above.

SUMMARY

One embodiment of the present invention provides a system that facilitates efficiently resolving symbolic references in a virtual machine to support in-place execution. During operation, the system loads an in-place executable file into the virtual machine, and receives a pointer that points to an unresolved symbol value in the in-place executable file. This unresolved symbol value includes an offset value that points to a subsequent unresolved symbol value in a chain of unresolved symbol values within the in-place executable file, and a token value that can be used to look up a corresponding resolved reference value in an unresolved symbol table. The system then uses the token value to look up the corresponding resolved reference in the unresolved symbol table, and replaces the unresolved symbol value with the corresponding resolved reference.

In a variation on this embodiment, the system additionally uses the offset value to locate the subsequent unresolved symbol value, wherein the subsequent unresolved symbol value comprises a subsequent offset value that points to a second subsequent unresolved symbol value, and a subsequent token value that can be used to look up a corresponding subsequent resolved reference value in the unresolved symbol table. The system then looks up the corresponding subsequent resolved reference in the unresolved symbol table using the subsequent token value from the subsequent unresolved symbol value, and replaces the subsequent unresolved symbol value with the corresponding subsequent resolved reference.

If necessary, the system repeats the process of locating a subsequent unresolved symbol value, looking up a corresponding subsequent resolved reference, and replacing the subsequent unresolved symbol value, for all unresolved symbol values in the chain of unresolved symbol values.

In a variation on this embodiment, the system terminates the process of resolving references when a token with a predefined termination value is reached.

In a variation on this embodiment, the unresolved symbol value additionally includes a flag. If the flag is set, the system additionally reads the memory location immediately following the unresolved symbol value to obtain a supplemental unresolved symbol value. This supplemental unresolved symbol value includes a supplemental flag, a supplemental token value, and a supplemental offset value. The system then adds the token value and the supplemental token value to create a combined token value that can be used to look up the corresponding resolved reference in the unresolved symbol table. The system also adds the offset value and the supplemental offset value to create a combined offset value that can be used to locate the subsequent unresolved symbol value.

In a further variation, if the supplemental flag is set, the system additionally reads the memory location immediately following the supplemental unresolved symbol value to obtain a second supplemental unresolved symbol value. This second supplemental unresolved symbol value includes a second supplemental flag, a second supplemental token value, and a second supplemental offset value. The system then adds the token value, the supplemental token value, and the second supplemental token value to create the combined token value. The system also adds the offset value, the supplemental offset value, and the second supplemental offset value to create the combined offset value that can be used to locate the subsequent unresolved symbol value.

If necessary, the system repeats the process of reading the memory location immediately following the supplemental unresolved symbol value, adding the token value, the supplemental token value, and the second supplemental token value, and adding the offset value, the supplemental offset value, and the second supplemental offset value to create the combined offset value until an unresolved symbol value with a clear supplemental flag is read.

In a variation on this embodiment, the unresolved symbol value is the last unresolved symbol value in the in-place executable file and subsequent unresolved symbol values are organized in descending order from the end of the in-place executable file to the beginning of the in-place executable file.

In a variation on this embodiment, the unresolved symbol value is the first unresolved symbol value in the in-place executable file and subsequent unresolved symbol values are organized in ascending order from the beginning of the in-place executable file to the end of the in-place executable file.

In a variation on this embodiment, the system retrieves the pointer from the header of the in-place executable file.

In a variation on this embodiment, the virtual machine is a platform-independent virtual machine.

In a further variation, the virtual machine is a Java Virtual Machine.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Memory-Constrained Computing Device

Figure 1:
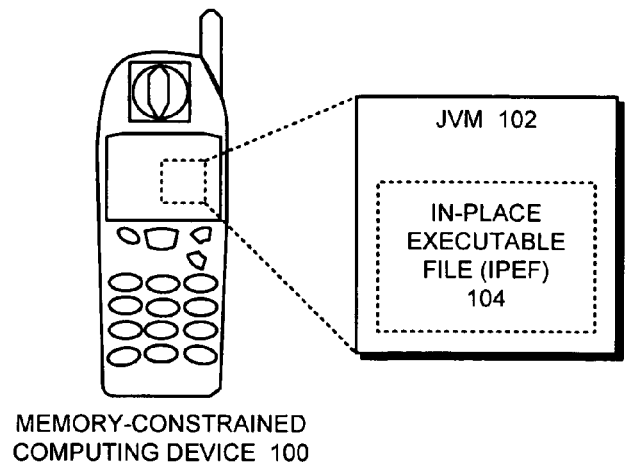
FIG. 1 illustrates a memory-constrained computing device in accordance with an embodiment of the present invention.

FIG. 1 illustrates a memory-constrained computing device 100 in accordance with an embodiment of the present invention. Memory-constrained computing device 100 can include any type of computing device, including, but not limited to, a cell phone, a computer system based on a microprocessor, a digital signal processor, a portable computing device, a personal organizer, a device controller, and a computational engine within an appliance. Memory-constrained computing device 100 contains Java Virtual Machine (JVM) 102, which in turn supports execution of In-Place Executable File (IPEF) 104. (The terms JAVA, JVM and JAVA VIRTUAL MACHINE are trademarks of SUN Microsystems, Inc. of Santa Clara, Calif.) Note that JVM 102 could be any type of platform-independent virtual machine, and is not meant to be limited to a Java Virtual Machine.

In-Place Executable File

Figure 2:
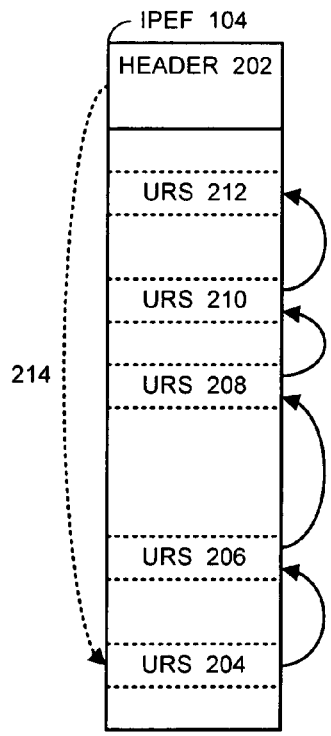
FIG. 2 illustrates an in-place executable file in accordance with an embodiment of the present invention.

FIG. 2 illustrates an in-place executable file 104 in accordance with an embodiment of the present invention. IPEF 104 includes header 202 and a chain of UnResolved Symbol References (URS) 204-212. In a typical embodiment of the present invention, each unresolved symbolic reference in the IPEF 104 is replaced by a URS value that contains the "token value" which identifies the symbolic reference. In addition, to avoid the need for large bitmaps or reference tables within IPEF 104, each URS includes an "offset value" that contains information about where the previous, or alternatively the next, URS in IPEF 104 is located. Note that URS 212 does not have to include a valid offset value because there is no URS preceding URS 212 in the example shown in FIG. 2.

Figure 3:
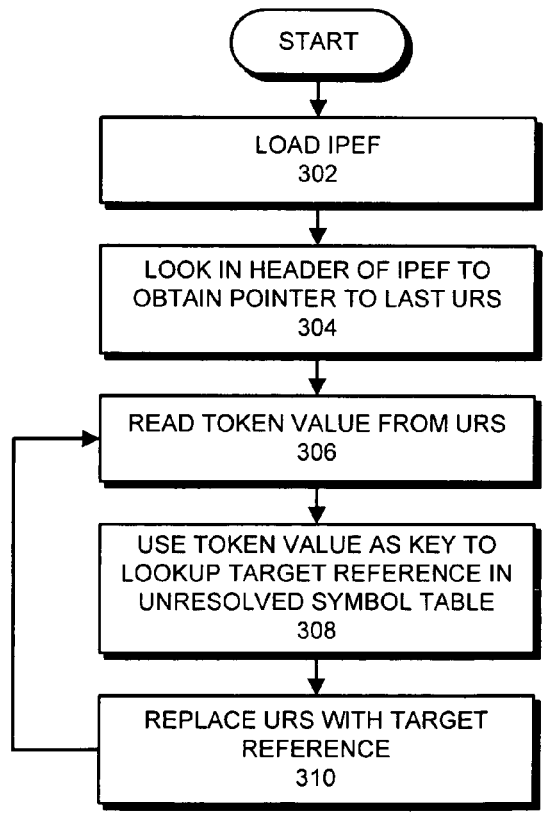
FIG. 3 presents a flowchart illustrating the process of resolving symbolic references in accordance with an embodiment of the present invention.

FIG. 3 presents a flowchart illustrating the process of resolving symbolic references in accordance with an embodiment of the present invention. The system starts by loading IPEF 104 into JVM 102 (step 302). Next, the system examines header 202 to obtain pointer 214, which points to the last URS in IPEF 104 (step 304). Note that in the present embodiment, the pointer points to the last URS in IPEF 104, and each URS in IPEF includes an offset to the preceding URS in IPEF 104. This backward chaining of URSs in IPEF 104 allows IPEF 104 to be created in a single forward pass. Otherwise, creating IPEF 104 would require a minimum of two passes because the offset in each URS could not be set on the first forward pass through IPEF 104 since the location of the next URS would not be known when the URS is encountered during the first forward pass through IPEF 104.

During application installation phase, the chain of unresolved symbols in IPEF 104 is traversed, and each URS in IPEF 104 is replaced with the actual target reference (for instance, a reference to a certain method or data structure), using the token value contained in each URS as the lookup key. To accomplish this, the system reads the token value from each URS (step 306) and uses the token value to lookup the target reference in an unresolved symbol table (step 308). Once the target reference is known, the system replaces the URS in IPEF 104 with the target reference (step 310), and repeats the process at step 306 for the next URS. Note that there is a special lookup function on the target platform that maps the given token values to the actual addresses on the target device. A numerical token value is assigned for each possible target reference. For example, in one embodiment of the invention, numeric value 1 could refer to a method called "interpreter_fast_method_entry__0_rom_prefix( )", numeric value 2 could refer to a method called "interpreter_fast_method_entry__1_rom_prefix( )", etc.

Unresolved Symbol Structure

Figure 4A:
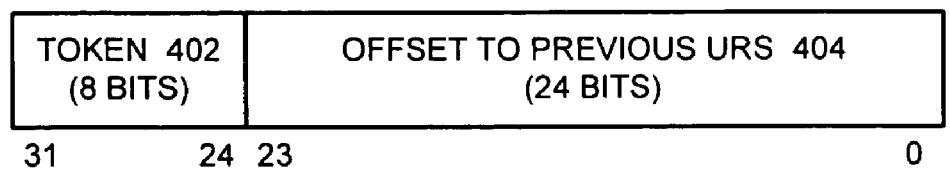
FIG. 4A illustrates a 32-bit unresolved symbol in accordance with an embodiment of the present invention.

FIG. 4A illustrates a 32-bit unresolved symbol in accordance with an embodiment of the present invention. In the embodiment illustrated by FIG. 3, each URS in IPEF 104 is structured like URS 400. Note that URS 400 includes an 8-bit token value 402 and a 24-bit offset value to a previous URS 404. Note that a 24-bit offset should be sufficient for applications in memory-constrained computing devices.

Figure 4B:
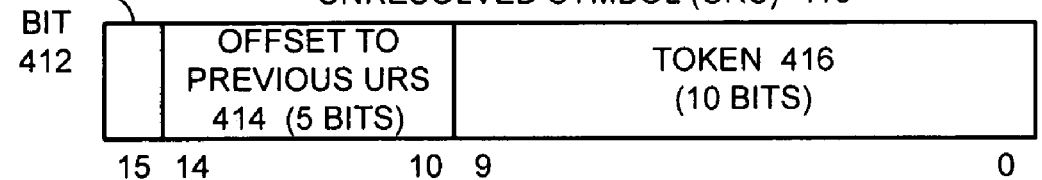
FIG. 4B illustrates a 16-bit unresolved symbol in accordance with an embodiment of the present invention.

FIG. 4B illustrates a 16-bit unresolved symbol in accordance with an embodiment of the present invention. In this embodiment, the actual amount of space used to store the token value and offset value is compressed based on the observation that most offsets are quite small. In the typical set of J2ME system classes with approximately 1300 relocation entries, 90% are less than 32 bytes from the previous entry. Given these characteristics, the 16-bit URS 410, illustrated in FIG. 4B, can operate efficiently and can save space as compared to a 32-bit URS.

URS 410 includes flag 412, offset 414 and token 416. Flag 412 enables each URS to essentially have an unlimited amount of space for offset 414 and token 416. This is accomplished by adding offset 414 to an offset in next entry, and adding token 416 to a token in next entry if flag-bit 412 is set. Note that the system will keep cumulatively adding the offset values and token values until an entry is reached where the flag is not set.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for resolving symbolic references in a virtual machine to support in-place execution, comprising:
   loading an in-place executable file into the virtual machine;
   receiving a pointer that points to an unresolved symbol value in the in-place executable file, wherein the unresolved symbol value comprises an offset value that points to a subsequent unresolved symbol value in a chain of unresolved symbol values within the in-place executable file, and a token value that can be used to look up a corresponding resolved reference value in an unresolved symbol table;
   using the token value to look up the corresponding resolved reference in the unresolved symbol table;
   replacing the unresolved symbol value with the corresponding resolved reference; and
   wherein the unresolved symbol value additionally includes a flag, wherein if the flag is set, the method additionally involves:
      reading the memory location immediately following the unresolved symbol value for a supplemental unresolved symbol value, wherein the supplemental unresolved symbol value includes a supplemental flag, a supplemental token value, and a supplemental offset value;
      adding the token value and the supplemental token value to create a combined token value that can be used to look up the corresponding resolved reference in the unresolved symbol table; and
      adding the offset value and the supplemental offset value to create a combined offset value that can be used to locate the subsequent unresolved symbol value.

2. The method of claim 1, further comprising:
   using the offset value to locate the subsequent unresolved symbol value, wherein the subsequent unresolved symbol value comprises a subsequent offset value that points to a second subsequent unresolved symbol value, and a subsequent token value that can be used to look up a corresponding subsequent resolved reference value in the unresolved symbol table;
   looking up the corresponding subsequent resolved reference in the unresolved symbol table using the subsequent token value from the subsequent unresolved symbol value;
   replacing the subsequent unresolved symbol value with the corresponding subsequent resolved reference; and
   repeating the process of locating a subsequent unresolved symbol value, looking up a corresponding subsequent resolved reference, and replacing the subsequent unresolved symbol value, for all unresolved symbol values in the chain of unresolved symbol values.

3. The method of claim 1, further comprising terminating the process of resolving references when a token with a predefined termination value is reached.

4. The method of claim 1, wherein if the supplemental flag is set, the method additionally involves:
   reading the memory location immediately following the supplemental unresolved symbol value for a second supplemental unresolved symbol value, wherein the second supplemental unresolved symbol value includes a second supplemental flag, a second supplemental token value, and a second supplemental offset value;
   adding the token value, the supplemental token value, and the second supplemental token value to create the combined token value;
   adding the offset value, the supplemental offset value, and the second supplemental offset value to create the combined offset value that can be used to locate the subsequent unresolved symbol value; and
   repeating the process of reading the memory location immediately following the supplemental unresolved symbol value, adding the token value, the supplemental token value, and the second supplemental token value, and adding the offset value, the supplemental offset value, and the second supplemental offset value to create the combined offset value until an unresolved symbol value with a clear supplemental flag is read.

5. The method of claim 1, wherein the unresolved symbol value is the last unresolved symbol value in the in-place executable file and subsequent unresolved symbol values are organized in descending order from the end of the in-place executable file to the beginning of the in-place executable file.

6. The method of claim 1, wherein the unresolved symbol value is the first unresolved symbol value in the in-place executable file and subsequent unresolved symbol values are organized in ascending order from the beginning of the in-place executable file to the end of the in-place executable file.

7. The method of claim 1, wherein receiving the pointer further comprises retrieving the pointer from the header of the in-place executable file.

8. The method of claim 1, wherein the virtual machine is a platform-independent virtual machine.

9. The method of claim 8, wherein the virtual machine is a Java Virtual Machine.

10. A computer-readable storage medium storing instructions that when executed by a computer cause the computer to perform a method for resolving symbolic references in a virtual machine to support in-place execution, the method comprising:

loading an in-place executable file into the virtual machine;

receiving a pointer that points to an unresolved symbol value in the in-place executable file, wherein the unresolved symbol value comprises an offset value that points to a subsequent unresolved symbol value in a chain of unresolved symbol values within the in-place executable file, and a token value that can be used to look up a corresponding resolved reference value in an unresolved symbol table;

using the token value to look up the corresponding resolved reference in the unresolved symbol table; and replacing the unresolved symbol value with the corresponding resolved reference; and wherein the unresolved symbol value additionally includes a flag, wherein if the flag is set, the method additionally involves reading the memory location immediately following the unresolved symbol value for a supplemental unresolved symbol value, wherein the supplemental unresolved symbol value includes a supplemental flag, a supplemental token value, and a supplemental offset value;

adding the token value and the supplemental token value to create a combined token value that can be used to look up the corresponding resolved reference in the unresolved symbol table; and adding the offset value and the supplemental offset value to create a combined offset value that can be used to locate the subsequent unresolved symbol value.

11. The computer-readable storage medium of claim 10, wherein the method further comprises:

using the offset value to locate the subsequent unresolved symbol value, wherein the subsequent unresolved symbol value comprises a subsequent offset value that points to a second subsequent unresolved symbol value, and a subsequent token value that can be used to look up a corresponding subsequent resolved reference value in the unresolved symbol table;

looking up the corresponding subsequent resolved reference in the unresolved symbol table using the subsequent token value from the subsequent unresolved symbol value;

replacing the subsequent unresolved symbol value with the corresponding subsequent resolved reference; and repeating the process of locating a subsequent unresolved symbol value, looking up a corresponding subsequent resolved reference, and replacing the subsequent unresolved symbol value, for all unresolved symbol values in the chain of unresolved symbol values.

12. The computer-readable storage medium of claim 10, wherein the method further comprises terminating the process of resolving references when a token with a pre-defined termination value is reached.

13. The computer-readable storage medium of claim 10, wherein if the supplemental flag is set, the method additionally involves:

reading the memory location immediately following the supplemental unresolved symbol value for a second supplemental unresolved symbol value, wherein the second supplemental unresolved symbol value includes a second supplemental flag, a second supplemental token value, and a second supplemental offset value;

adding the token value, the supplemental token value, and the second supplemental token value to create the combined token value;

adding the offset value, the supplemental offset value, and the second supplemental offset value to create the combined offset value that can be used to locate the subsequent unresolved symbol value; and repeating the process of reading the memory location immediately following the supplemental unresolved symbol value, adding the token value, the supplemental token value, and the second supplemental token value, and adding the offset value, the supplemental offset value, and the second supplemental offset value to create the combined offset value until an unresolved symbol value with a clear supplemental flag is read.

14. The computer-readable storage medium of claim 10, wherein the unresolved symbol value is the last unresolved symbol value in the in-place executable file and subsequent unresolved symbol values are organized in descending order from the end of the in-place executable file to the beginning of the in-place executable file.

15. The computer-readable storage medium of claim 10, wherein the unresolved symbol value is the first unresolved symbol value in the in-place executable file and subsequent unresolved symbol values are organized in ascending order from the beginning of the in-place executable file to the end of the in-place executable file.

16. The computer-readable storage medium of claim 10, wherein receiving the pointer further comprises retrieving the pointer from the header of the in-place executable file.

17. The computer-readable storage medium of claim 10, wherein the virtual machine is a platform-independent virtual machine.

18. The computer-readable storage medium of claim 17, wherein the virtual machine is a Java Virtual Machine.

19. An apparatus having a processor for resolving symbolic references in a virtual machine to support in-place execution, comprising:

a loading mechanism configured to load an in-place executable file into the virtual machine;

a receiving mechanism configured to receive a pointer that points to an unresolved symbol value in the in-place executable file, wherein the unresolved symbol value comprises an offset value that points to a subsequent unresolved symbol value in a chain of unresolved symbol values within the in-place executable file, a token value that can be used to look up a corresponding resolved reference value in an unresolved symbol table, and a flag;

a look up mechanism configured to use the token value to look up the corresponding resolved reference in the unresolved symbol table;

a replacement mechanism configured to replace the unresolved symbol value with the corresponding resolved reference;

a reading mechanism configured to read the memory location immediately following the unresolved symbol value for a supplemental unresolved symbol value, wherein the supplemental unresolved symbol value includes a supplemental flag, a supplemental token value, and a supplemental offset value;

a token adding mechanism configured to add the token value and the supplemental token value to create a combined token value that can be used to look up the corresponding resolved reference in the unresolved symbol table;

an offset adding mechanism configured to add the offset value and the supplemental offset value to create a combined offset value that can be used to locate the subsequent unresolved symbol value; and wherein the reading mechanism, the token adding mechanism, and the offset adding mechanism are configured to operate if the flag is set.

20. The apparatus of claim 19, further comprising:

a location mechanism configured to use the offset value to locate the subsequent unresolved symbol value, wherein the subsequent unresolved symbol value comprises a subsequent offset value that points to a second subsequent unresolved symbol value, and a subsequent token value that can be used to look up a corresponding subsequent resolved reference value in the unresolved symbol table;

wherein the look up mechanism is further configured to look up the corresponding subsequent resolved reference in the unresolved symbol table using the subsequent token value from the subsequent unresolved symbol value;

wherein the replacement mechanism is further configured to replace the subsequent unresolved symbol value with the corresponding subsequent resolved reference; and wherein the apparatus is further configured to repeat the process of locating a subsequent unresolved symbol value, looking up a corresponding subsequent resolved reference, and replacing the subsequent unresolved symbol value, for all unresolved symbol values in the chain of unresolved symbol values.

21. The apparatus of claim 19, wherein the apparatus is further configured to terminate the process of resolving references when a token with a pre-defined termination value is reached.

22. The apparatus of claim 19:

wherein the reading mechanism further configured to read the memory location immediately following the supplemental unresolved symbol value for a second supplemental unresolved symbol value, wherein the second supplemental unresolved symbol value includes a second supplemental flag, a second supplemental token value, and a second supplemental offset value;

wherein the token adding mechanism further configured to add the token value, the supplemental token value, and the second supplemental token value to create the combined token value;

wherein the offset adding mechanism is further configured to add the offset value, the supplemental offset value, and the second supplemental offset value to create the combined offset value that can be used to locate the subsequent unresolved symbol value;

wherein the reading mechanism, the token adding mechanism, and the offset adding mechanism are configured to operate if the supplemental flag is set; and wherein the reading mechanism, the token adding mechanism, and the offset adding mechanism are configured to operate until an unresolved symbol value is reached with a supplemental flag that is not set.

23. The apparatus of claim 19, wherein the unresolved symbol value is the last unresolved symbol value in the in-place executable file and subsequent unresolved symbol values are organized in descending order from the end of the in-place executable file to the beginning of the in-place executable file.

24. The apparatus of claim 19, wherein the unresolved symbol value is the first unresolved symbol value in the in-place executable file and subsequent unresolved symbol values are organized in ascending order from the beginning of the in-place executable file to the end of the in-place executable file.

25. The apparatus of claim 19, wherein the receiving mechanism is further configured to retrieve the pointer from the header of the in-place executable file.

26. The apparatus of claim 19, wherein the virtual machine is a platform-independent virtual machine.

27. The apparatus of claim 26, wherein the virtual machine is a Java Virtual Machine.

* * * * *